(12) United States Patent  
Schenk

(10) Patent No.: US 7,286,621 B1
(45) Date of Patent: Oct. 23, 2007

(54) RECEPTION METHOD AND RECEIVER ARRAY FOR A DUPLEX TRANSMISSION SYSTEM

(75) Inventor: Heinrich Schenk, Munich (DE)

(73) Assignee: Infineon Technologies AG, Munich ( * ) Notice: Subject to any disclaimer, the term of this patent is extended or adjusted under 35 U.S.C. 154(b) by 963 days.

(21) Appl. No.: 10/049,252

(22) PCT Filed: Aug. 9, 2000

(86) PCT No.: PCT/EP00/07746

§ 371 (c)(1),
(2), (4) Date: Jun. 3, 2002

(87) PCT Pub. No.: WO01/11796

PCT Pub. Date: Feb. 15, 2001

(30) Foreign Application Priority Data

Aug. 9, 1999 (DE) ................................ 199 37 505

(51) Int. Cl.
*H04B 1/10* (2006.01)
(52) U.S. Cl. ...................................... 375/350; 370/286
(58) Field of Classification Search ........ 370/286–292, 370/276; 375/220–222, 229, 230, 232, 233, 375/235, 236, 219, 285, 346, 350; 379/406.01–406.16
See application file for complete search history.

(56) References Cited

U.S. PATENT DOCUMENTS

| 4,087,654 | A | * | 5/1978 | Mueller .................. 379/406.08 |
| 4,334,313 | A | * | 6/1982 | Gitlin et al. ................. 375/355 |
| RE31,253 | E | * | 5/1983 | Weinstein .................... 370/286 |
| 5,095,495 | A | * | 3/1992 | Golden ......................... 375/234 |
| 5,163,044 | A | * | 11/1992 | Golden ......................... 370/286 |
| 5,513,216 | A | * | 4/1996 | Gadot et al. ................. 375/233 |
| 5,642,382 | A | * | 6/1997 | Juan ............................. 375/232 |
| 6,421,377 | B1 | * | 7/2002 | Langberg et al. ........... 375/222 |
| 6,542,477 | B1 | * | 4/2003 | Pal et al. ..................... 370/286 |
| 6,618,451 | B1 | * | 9/2003 | Gonikberg .................. 375/341 |
| 6,751,313 | B2 | * | 6/2004 | Zad Issa ................. 379/406.01 |
| 2001/0012319 | A1 | * | 8/2001 | Foley ......................... 375/222 |

FOREIGN PATENT DOCUMENTS

DE        DD 211 029 A        6/1984

OTHER PUBLICATIONS

International Search Report, mailed Dec. 8, 2000, PCT/EP00/07746.

* cited by examiner

*Primary Examiner*—Doris H. To
*Assistant Examiner*—Habte Mered
(74) *Attorney, Agent, or Firm*—Fish & Richardson P.C.

(57) ABSTRACT

The invention relates to a duplex transmission system, wherein an echo compensation signal (yec(k·t)) is generated which is combined with a receive signal (u(t)) to prevent crosstalk from the own transmitter to the receiver. Before feeding the receive signal to the echo compensation device (6, 7), the receive signal is initially scanned with the double symbol rate, equalized and subsequently scanned once again with the simple symbol rate so that only one compensation value per receive signal has to be generated by the echo compensation device (6, 7).

9 Claims, 3 Drawing Sheets

RECEPTION METHOD AND RECEIVER ARRAY FOR A DUPLEX TRANSMISSION SYSTEM

BACKGROUND

The transmission of data in the baseband using pulse amplitude modulation (PAM) is advantageous particularly when additional signals, such as voice signals for an additional telephone channel, do not need to be transmitted simultaneously in the audio frequency range. In contrast to carrier modulated transmission systems, such as QAM (quadrature amplitude modulation) or DMT (discrete multitone modulation) transmission systems, PAM transmission systems use virtually the whole frequency range starting at a bottom cut-off frequency, which is essentially determined by the characteristics of the line access circuit.

Pulse amplitude modulation is also used in duplex transmission systems, inter alia, in which data are transmitted simultaneously in both directions of the transmission channel or of the transmission line. Such duplex transmission systems require echo compensation in order to suppress the crosstalk from their own transmitter to the receiver in the same transmission unit, which would result in echo effects. The echo compensation simultaneously manages to make it possible to use the available bandwidth in optimum fashion at both ends, so that such transmission systems are distinguished, in particular, by a relatively long range for a prescribed interference environment.

FIG. 3 shows the basic arrangement of a PAM receiver in such a duplex data transmission system. A received signal u(t) is filtered by an analogue input filter 1 and is then sampled at the symbol rate 1/T by a sampler 2, so that these samples of the received signal are available at intervals of k·T. Instead of the analogue input filter 1, it is also possible to use a digital input filter if the sampling frequency is chosen to be appropriately high. Sampling at the symbol rate 1/T can be followed by a further filter stage 5, which is generally produced by a digital high-pass filter. This further filter 5 is used, in particular, to suppress low frequency interference, such as the offset, and to improve the transient response. An echo compensator 6 produces an echo compensation signal yec(k·T) on the basis of the transmitted data x(k·T) from the transmitter in the same duplex transmission unit and subtracts it from the sampled and equalized received signal y'(k·T) using the adder 7 shown in FIG. 3. The received signal echo-compensated in this way is finally equalized and is output as y(k·T) for further processing, in particular for demodulation, so that the respectively transmitted data can be recovered. The linear equalizer 8 used is generally a digital nonrecursive filter whose coefficients respectively need to be set adaptively to the current transmission channel. Since the received-signal values sampled at the symbol rate 1/T, filtered and freed of echo are supplied to the equalizer 8 as input signal, the equalizer 8 is also referred to as a T equalizer. Downstream of the equalizer 8, a decision feedback equalizer 9 is normally used in addition which compensates for the post-transients of the pulse response for the respective transmission channel and generally results in a better transmission response.

In many instances of application, a better transmission response can be attained for the same interference environment if an equalizer is used whose input signal is sampled at twice the symbol rate of the received signal, i.e. at the frequency 2/T. Such an equalizer is therefore also referred to as a T/2 equalizer.

A corresponding receiver arrangement having such a T/2 equalizer is shown in FIG. 4, where those elements which correspond to the elements shown in FIG. 3 have been provided with the same reference symbols. As can be seen in FIG. 4, the received signal u(t) is sampled at twice the symbol rate 2/T by the sampler 2 and is supplied to the echo compensator 6 via the digital high-pass filter 5. On account of the sampling frequency being doubled, the echo compensator has to produce two compensation values y(k·T/2) per received symbol in this case. The received signal echo-compensated in this way is supplied to the T/2 equalizer 8 and is sampled at the output of the T/2 equalizer at once the symbol rate 1/T by a further sampler 13 and is output to the decision feedback equalizer 9.

The fundamental drawback of this receiver arrangement is that the echo compensator 6, as has already been explained, has to produce two compensation values per received symbol, i.e. twice as many compensation values as in the case of the arrangement shown in FIG. 3. For this reason, the complexity of producing the echo compensator 6, which is the main portion of the total complexity anyway, is virtually doubled.

This is intended to be demonstrated by the illustration shown in FIG. 5, which shows a possible circuit arrangement for the echo compensator 6 shown in FIG. 4 for a transmission system having a T/2 equalizer 8. The echo compensator 6 essentially comprises two paths, with the upper path generating the components of the echo compensation signal yec(k·T) for the sampling instants k·T+T/2, and the lower path generating the components of the echo compensation signal for the sampling instants k·T. The compensation values generated by the two paths using delay elements 14, multipliers 15 with settable multiplication coefficients $h_{1,1} \ldots h_{N,1}$ and $h_{1,2} \ldots h_{N,2}$, and adders 16 are forwarded alternately at the output. An echo compensator for a transmission system having a T equalizer would, by contrast, require only one path, since in that case only one compensation value would need to be generated per received symbol.

DE-C-211 029 discloses a generic reception method for duplex transmission and a generic associated receiver arrangement which sample a received signal at twice the symbol rate of the received signal before echo compensation and equalization.

DE 30 09 450 A1 discloses an echo cancellation arrangement for homochronous data transmission systems, where the received signal is also sampled at once the symbol rate, but only after echo compensation.

"Adaptive Sprecherecho-Kompensation in Modems fur die Duplex-Datenubertragung im Fernsprechnetz" [Adaptive Speaker Echo Compensation in modems for duplex data transmission in the telephone network], Frequenz 6/1983, pp. 145-153, likewise discloses respective sampling before and after the echo compensation.

DE 38 28 623 C2 discloses a method for producing phase shifts for phase modulation or phase keying or quadrature amplitude modulation.

SUMMARY

The present invention is therefore based on the object of proposing a reception method for a duplex transmission system and also an appropriate receiver arrangement, where comparable transmission characteristics to those when using a T/2 equalizer can be achieved but, at the same time, the increased complexity of producing the echo compensator is avoided.

The invention proposes first sampling the received signal at twice the symbol rate and supplying it to an additional equalizer, namely a T/2 equalizer. At the output of this additional equalizer, the equalized received signal is sampled at the symbol rate, so that only every second value is supplied to the echo compensator and used for further processing.

The other components of the receiver arrangement can then correspond to the arrangement shown in FIG. 3 having a T equalizer.

The additional equalizer used may, in particular, be a digital nonrecursive filter whose input receives the received-signal values present at twice the symbol rate of the received signal, with the output of the digital nonrecursive filter outputting received-signal values at once the symbol rate. In this context, the coefficients of the digital nonrecursive filter must not change during data transmission and should therefore be set permanently.

The advantage of the present invention is that the echo compensator used for echo compensation need generate only one compensation value per received signal output by the additional equalizer, and hence can be produced with relatively low circuit complexity. In particular, the complexity of implementation is comparable to that for an echo compensator for a duplex transmission system having a T equalizer (cf. FIG. 3). On the other hand, the present invention can be used to achieve such a good transmission response as is comparable to that of a system having a T/2 equalizer.

The present invention is particularly suitable for use in duplex PAM data transmission systems. In principle, however, the present invention can also be used in any other duplex transmission systems.

The invention is explained in more detail below using a preferred exemplary embodiment with reference to the appended drawing.

DESCRIPTION

Figure 1:
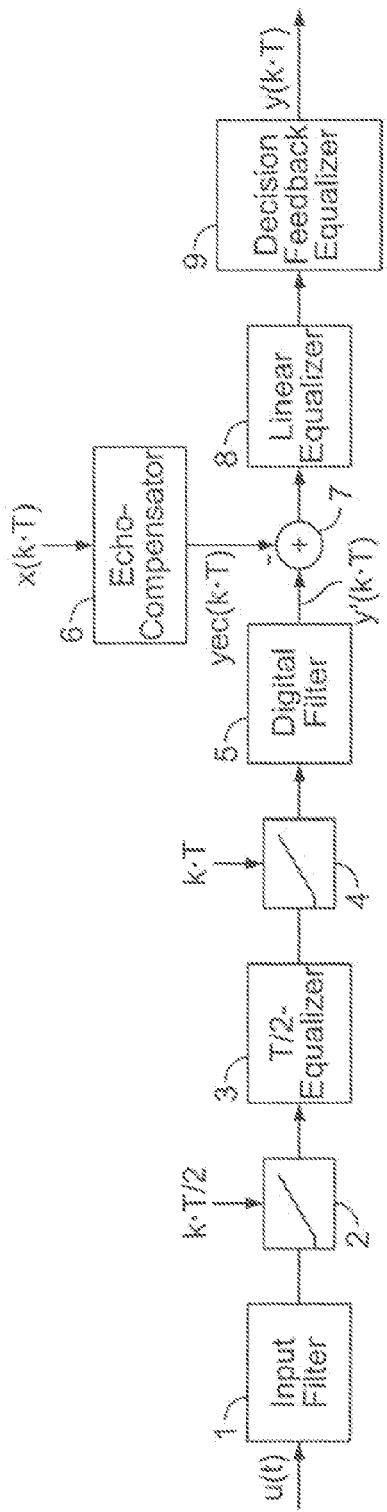
FIG. 1 shows a block diagram of a receiver arrangement for a duplex transmission system based on the present invention.
Figure 3:
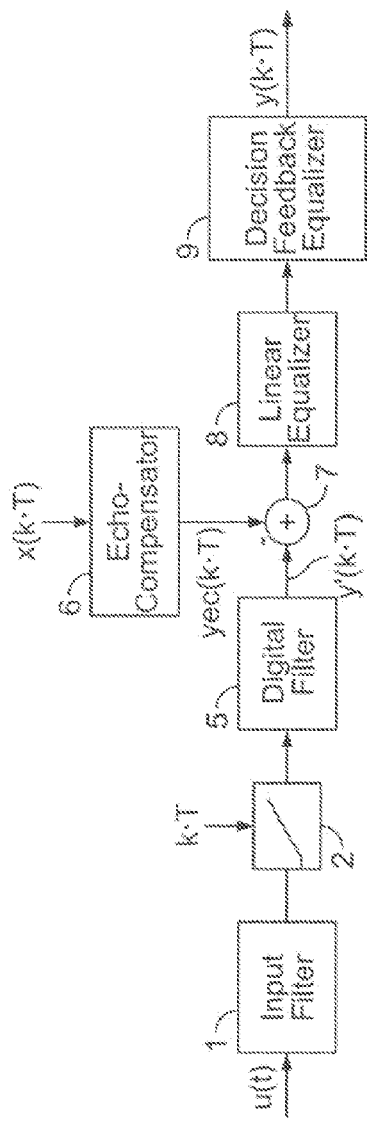
FIG. 3 shows a block diagram of a known receiver arrangement for a duplex transmission system based on the prior art.
Figure 4:
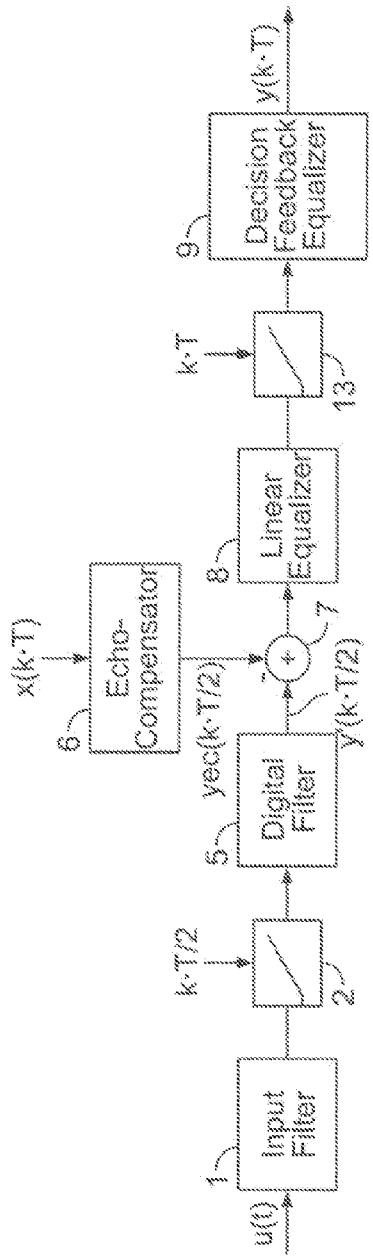
FIG. 4 shows a block diagram of another known receiver arrangement for a duplex transmission system based on the prior art.
Figure 5:
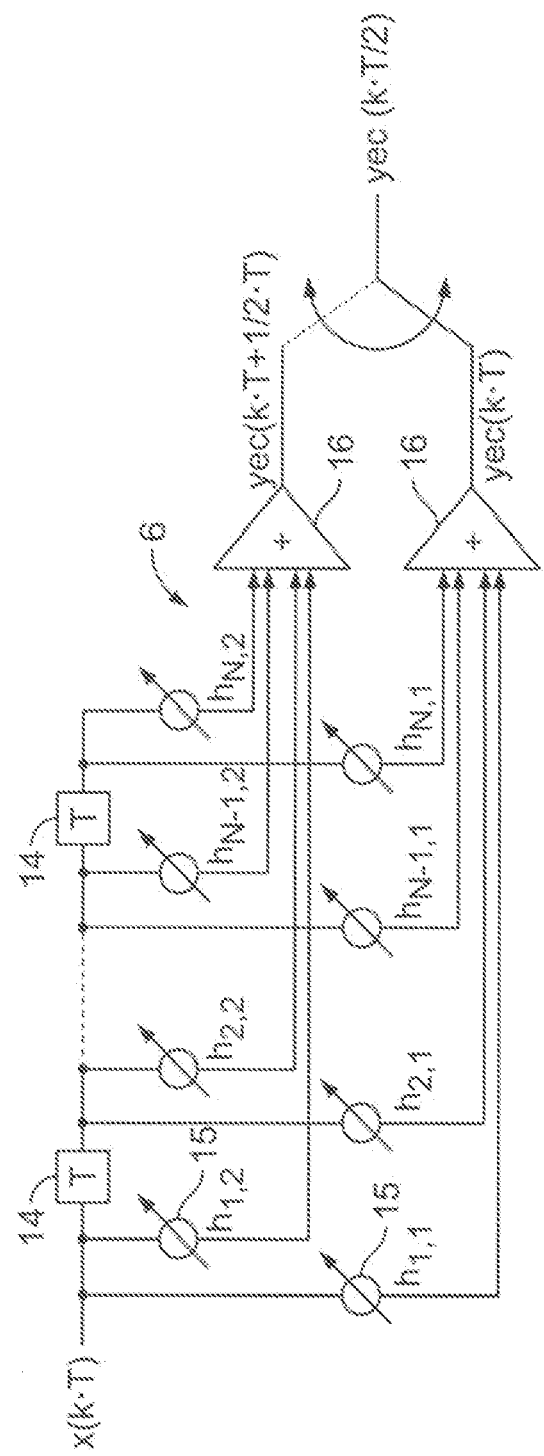
FIG. 5 shows a possible circuit design for an echo compensator shown in FIG. 4.

FIG. 1 shows an inventive receiver arrangement for a duplex PAM data transmission system, where the elements corresponding to the elements shown in FIGS. 3 and 4 have been provided with the same reference symbols.

As FIG. 1 shows, a received signal u(t) is first filtered using an (analog or digital) input filter 1 and is sampled at twice the symbol clock or twice the symbol rate of the received signal by a sampler 2. This sampled signal is supplied to an additionally inserted unit, namely a T/2 equalizer 3, which can also be referred to as a compromise equalizer. A further sampler 4, which samples the equalized received signal at once the symbol rate, is used to take only every second sample at the output of this additional T/2 equalizer 3 for further processing. The rest of the circuit arrangement corresponds to the known circuit arrangement having a T equalizer, as shown in FIG. 3 and already explained in detail. Hence, by way of addition, reference is made to the statements regarding FIG. 3 in relation to the other elements of the receiver arrangement shown in FIG. 1.

It should be noted, in particular, that the echo compensator shown in FIG. 1 need generate only one compensation value per symbol, and hence can be produced with correspondingly low complexity.

The T/2 equalizer 3 used in accordance with FIG. 1 can, in particular, be formed by a digital nonrecursive filter whose input receives the received-signal values present at twice the symbol rate of the received signal u(t), the digital nonrecursive filter in combination with the sampler 4 outputting received-signal values at once the symbol rate at the output.

Figure 2:
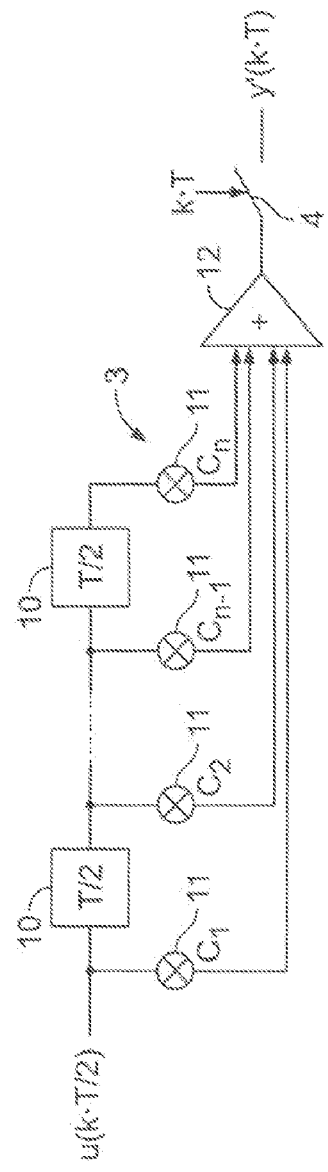
FIG. 2 shows a possible circuit design for a T/2 equalizer shown in FIG. 1.

A block diagram of an appropriate equalizer 3 is shown by way of example in FIG. 2. As can be seen in FIG. 2, this digital nonrecursive filter 3 comprises a plurality of T/2 delay elements 10 and also multipliers 11 arranged in the individual forward paths, the output values of the individual forward paths being added by an adder 12 and supplied to the sampler 4 as output signal. The coefficients $c_1 \ldots c_n$ for these multipliers 11 must not change during data transmission and should therefore be set permanently. When proportioning these coefficients $c_1 \ldots c_n$, however, the characteristics of a particular transmission channel in the respective duplex data transmission system can be taken into account. The actual matching to the respectively current transmission channel is performed, as has already been explained, by the adaptive T equalizer 8, to which the received-signal values equalized by the T/2 equalizer 3, filtered using the filters 1 and 5 and echo-compensated by the echo compensator 6 are supplied.

The invention claimed is:

1. A method for receiving a received signal transmitted via a duplex transmission system, the method comprising:
   receiving the received signal from a duplex transmission unit in the duplex transmission system;
   sampling the received signal at twice a symbol rate of the received signal;
   generating an echo compensation signal in an echo compensation device on the basis of a transmitted signal from the duplex transmission unit;
   combining the echo compensation signal with the sampled received signal to obtain an echo-compensated received signal;
   equalizing the echo-compensated received signal; and
   outputting the echo-compensated received signal for further processing;
   wherein after sampling at twice the symbol rate, the received signal is equalized and the equalized received signal is sampled again at once the symbol rate and is subsequently supplied to the echo compensation device.

2. The method of claim 1, wherein the received signal is equalized using a nonrecursive digital filter after the sampling at twice the symbol rate and before the sampling at once the symbol rate.

3. The method of claim 2, wherein the nonrecursive digital filter has a set of coefficients unaltered during data transmission.

4. A receiver arrangement for a duplex transmission unit, the receiver arrangement comprising:

a first sampling device for sampling a received signal from the duplex transmission unit at twice a symbol rate of the received signal;

an echo compensator device for producing an echo compensation signal on the basis of a transmitted signal from the duplex transmission unit, with the echo compensation signal being combined in the echo compensation device with the received signal sampled by the first sampling device to obtain an echo-compensated received signal; and a first equalizer for equalizing the echo-compensated received signal and for outputting the equalized and echo-compensated received signal for further processing;

wherein the first sampling device and the echo compensation device include a second equalizer arranged between the first sampling device and the echo cancellation device to which the received signal sampled at twice the symbol rate by the first sampling device is supplied for equalization; and wherein a second sampling device is provided to sample the received signal equalized by the second equalizer at once the symbol rate and to subsequently supply the received signal to the echo compensation device.

5. The receiver arrangement of claim 4, wherein the second equalizer includes a digital filter.

6. The receiver arrangement of claim 5, wherein the second equalizer includes a nonrecursive digital filter.

7. The receiver arrangement of claim 6, wherein a set of coefficients of the second equalizer is set permanently.

8. The receiver arrangement of claim 4, wherein the received signal is supplied to the sampling device via a reception filter, the received signal being sampled at once the symbol rate by the second sampling device and being equalized by the second equalizer, the received signal being supplied to the echo compensation device via a digital high-pass filter.

9. The receiver arrangement of claim 8, wherein the first equalizer includes a digital nonrecursive filter with adaptively settable filter coefficients, the first equalizer having a decision feedback equalizer connected in series therewith, the decision feedback equalizer being configured to output the equalized and echo-compensated received signal for further processing.

* * * * *